United States Patent [19]

Jäger

[11] 3,916,009
[45] Oct. 28, 1975

[54] PROCESS FOR THE MANUFACTURE OF PERFLUOROALKYLALKYL ESTERS

[75] Inventor: Horst Jäger, Bettingen, Switzerland

[73] Assignee: Ciba-Geigy AG, Basel, Switzerland

[22] Filed: Mar. 1, 1973

[21] Appl. No.: 337,028

[30] Foreign Application Priority Data

Mar. 16, 1972 Switzerland.................... 003940/72
Dec. 21, 1972 Switzerland.................... 018659/72

[52] U.S. Cl. ........................ 260/485 F; 260/486 H
[51] Int. Cl.² ................ C07C 69/54; C07C 69/60
[58] Field of Search ............ 260/485 F, 486 H, 492

[56] References Cited
UNITED STATES PATENTS

| | | | |
|---|---|---|---|
| 3,283,012 | 11/1966 | Day................................. | 260/486 H |
| 3,527,790 | 9/1970 | Moundlie et al.................... | 260/492 |
| 3,781,370 | 12/1973 | Anello et al. .................... | 260/486 H |

*Primary Examiner*—Robert Gerstl
*Assistant Examiner*—E. Jane Skelly
*Attorney, Agent, or Firm*—Joseph G. Kolodny; Prabodh I. Almaula; Edward McC. Roberts

[57] ABSTRACT

A new process for the manufacture of perfluoroalkylalkyl esters of the formula

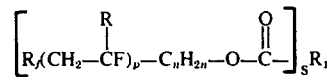

wherein $R_f$ is a perfluoroalkyl radical with 4 to 14 carbon atoms, R is hydrogen or fluorine, $R_1$ is an ethylenically unsaturated hydrocarbon radical of organic mono-, di- or tribasic acids with 3 to 6 carbon atoms, $n$ is a whole number from 1 to 12, $p$ is 0 or a whole number from 1 to 3, and $s$ is a whole number from 1 to 3, is provided. The esters are obtained by reacting perfluoroalkylalkyl iodide of the formula

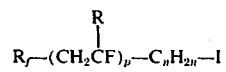

with oleum and subsequently, without isolation of the intermediate with an organic carboxylic acid of the formula $R_1—(COOH)_s$. The reaction products constitute valuable finishing agents for rendering materials, for example textiles, water and oil repellant.

13 Claims, No Drawings

PROCESS FOR THE MANUFACTURE OF PERFLUOROALKYLALKYL ESTERS

The present invention relates to a process for the manufacture of perfluoroalkylalkyl esters of the formula (1) 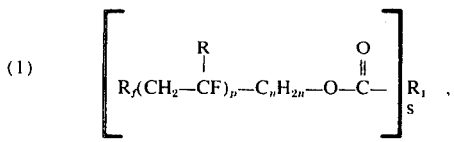

wherein $R_f$ represents an unbranched or branched perfluoroalkyl radical with 4 to 14 carbon atoms, R represents hydrogen or fluorine, $R_1$ represents an ethylenically unsaturated hydrocarbon radical of organic mono-, di- or tribasic carboxylic acids with 3 to 6 carbon atoms, $n$ is a whole number from 1 to 12, $p$ is 0 or a whole number from 1 to 3, and $s$ is a whole number from 1 to 3, which process consists in reacting a perfluoroalkylalkyl iodide of the formula (2) 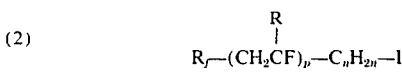

with oleum and subsequently reacting the reaction mixture, without isolation of the perfluoroalkylalkyl iodide/oleum reaction product, with an organic carboxylic acid of the formula (3) $R_1-(COOH)_s$ Suitable starting materials for carrying out the process are perfluoroalkylalkyl iodides of the formula (4) 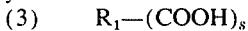

wherein $m$ is a whole number from 4 to 12, $n$ is a whole number from 1 to 12, preferably from 2 to 6, and $p$ is 0 or a whole number from 1 to 3, preferably 0. It is advantageous to use those perfluoroalkylalkyl iodides which correspond to the formulae (5) $F-(CF_2)_m-CH_2-CH_2-I$ and (6) 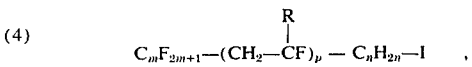

and to the formulae (7) $F-(CF_2)_m(CH_2-CF_2)_{p'}-CH_2-CH_2-I$, (8) $F-(CF_2)_m(CH_2-CHF)_{p'}-CH_2-CH_2-I$, (9) 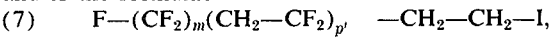

(10) 

and wherein $m$ has the meaning given hereinbefore and $p'$ is a whole number from 1 to 3, preferably 1.

Further perfluoroalkylalkyl iodides which contain branched perfluoroalkyl radicals correspond e.g. to the formula

(11) 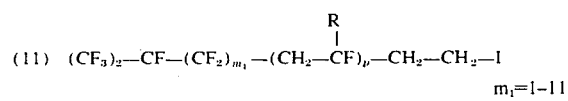 $m_1=1-11$

(12)  $m_2=1-4$,

(13) 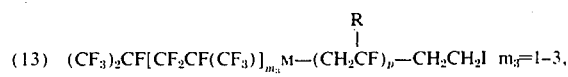 $m_3=1-3$, wherein R is hydrogen or fluorine and $p$ is 0 or a whole number from 1 to 3, preferably 0.

The perfluoroalkylalkyl iodides can be obtained by reaction of perfluoroalkyl iodides with alkylenes, e.g. ethylene or propylene, optionally by previous reaction with vinyl or vinylidene fluoride, in the presence of catalysts.

The ethylenically unsaturated mono-, di- or tribasic carboxylic acids used for carrying out the process contain from 3 to 6 carbon atoms. Examples of acids belonging to them are: acrylic acid, methacrylic acid, crotonic acid, vinylacetic acid, fumaric acid, maleic acid, methylenemalonic acid, citraconic acid, mesaconic acid, itaconic acid, and aconitic acid.

Oleum is used as reactant for the first step of the reaction and simultaneously as reaction medium. The reaction temperature is about 30° to 130° C, preferably 90° to 120° C. It is appropriately so chosen that both reactants are fluid and furthermore that a good blending of iodide and oleum can take place. The melting point of 100% sulphuric acid (no free $SO_3$) is 10.5° C. On addition of free $SO_3$ in an amount of 13% the melting point falls to $-10°$ C, then rises until it reaches a maximum of 35° C at an $SO_3$ content of 45%, and then falls again. The melting point of 20 to 25% oleum is about 10° C. Oleum with an $SO_3$ content of from 20 to 50%, preferably from 20 to 30%, is expediently used for the reaction.

The iodides have melting points which in known manner increase with the number of carbon atoms. The iodides which are preferably used according to the invention are solid at room temperature and it is necessary to heat them to temperatures above their melting points for the reaction.

The reaction takes place already at room temperature if liquid iodides are used; but by raising the temperature the yield is substantially improved. The weight ratio of iodide to oleum is about 1:2 to 1:10, and is preferably in the range 1:2 to 1:3.

The reaction takes place by addition of the fluorinated iodide to oleum, advantageously with stirring. The iodides are not very readily soluuble in oleum, but they do dissolve as the reaction proceeds. The non-isolated intermediate product is soluble in oleum. Vigorous evolution of $SO_2$ occurs during the reaction, and furthermore the reaction mixture is turned dark by the resulting iodine, which is probably formed by oxidation of hydrogen iodide with sulphuric acid or sulphur trioxide. Upon completion of the first step, which requires a reaction time of from 1 to 2 hours, excess sulphur trioxide which is still present is converted into sulphuric acid by the slow addition of water, the temperature being kept at the reaction temperature of the first step, i.e. preferably at about 90° to 120° C. For the second reaction step, the reaction mixture is treated with an organic aromatic solvent which can contain the ethylenically unsaturated carboxylic acid in solution. However, it is also possible to add the carboxylic acid in a separate step. The temperature is kept in about the same range as during the first reaction step, preferably at the boiling temperatures (80° to 150° C) of the aromatic solvent used. Examples of suitable solvents are: benzene, toluene and xylene and other benzene compounds. The reaction time for the second step can be about from 1 to 10 hours. In order to prevent e.g. a possible polymerisation of the ethylenically unsaturated carboxylic acids during the reaction, it is expedient to add polymerisation inhibitors, for example hydroquinone-monomethyl ether, to the reaction mixture.

The working up of the reaction mixture is effected by distilling off the aromatic solvent, by which means all the iodine which has formed is also removed simultaneously. The valuable iodine can be recovered from this distillate by various methods. For example, it is possible to shake the organic, iodine-containing solvent with concentrated sodium sulphite solution and subsequently to precipitate the resulting the resulting iodine from the aqueous phase using an oxidant and to isolate it.

The distillation residue — the sulphuric acid phase — is diluted with an organic solvent, preferably an ether, and taken up in ice water. The solvent and water phase is separated and the latter is repeatedly extracted. The combined solvent phases are washed neutral, the solvent is removed by distillation, and perfluoroalkylalkyl esters of ethylenically unsaturated mono-, di- or tribasic carboxylic acids are obtained as reaction products of the process according to the invention by high vacuum distillation, crystallisation and/or other suitable fractionation and purification methods. It is possible to manufacture the esters by the process according to the invention from perfluoroalkylalkyl iodides without isolation of intermediate products. The iodine formed in the first reaction step does not impair the further course of the reaction. It is surprising that all the iodine which has formed can be removed from the reaction mixture with the aromatic solvent used in the second reaction step. The process according to the invention constitutes a commercially and chemically simple method for the manufacture of valuable perfluoroalkylalkyl esters of unsaturated carboxylic acids. The easy availability of the desired esters in high yield is unexpected, since under the given crude reaction conditions one would expect, if anything, an abundance of byproducts. As monomers and also in polymerised form, these esters constitute valuable finishing agents for rendering porous materials, for example textiles, water and oil repellant.

The following Examples will serve to illustrate the invention, but do not limit its scope in any way. Percentages are by weight.

EXAMPLE 1

Step 1

100 ml of 25% oleum is put into a 500 ml flask equipped with stirrer, thermometer and reflux cooler and heated to 90° C. 100 g of perfluoroalkyl ethyliodide *) are added dropwise to the oleum within 30 minutes, in the course of which the exothermic reaction is kept at 90° C. Copious evolution of $SO_2$ and iodine occurs. The reaction is stirred for 30 minutes at 90° C. The excess sulphur trioxide is converted into sulphuric acid by the dropwise addition of 19.15 g of $H_2O$ within 20 minutes, in the course of which the temperature is kept constant at 90° C. Then 500 ml of benzene are added and the benzene is distilled off over a distillation bend. The benzene which is distilled off is deep violet in colour. The benzene in the reaction vessel is kept at a volume of 500 ml by addition of fresh benzene. Altogether 1500 ml of benzene are distilled off.

*)
Composition of the perfluoroalkylethyl iodide mixture:
23,75%   $C_6F_{13}CH_2CH_2I$      The ultimate analyses
46,61%   $C_8F_{17}CH_2CH_2I$      were always calculated on
24,68%   $C_{10}F_{21}CH_2CH_2I$   $R_f = C_8F_{17}$
Also $C_{12}F_{25}CH_2CH_2I$ and impurities All the benzene fractions distilled off are shaken with concentrated sodium sulphite solution. The iodide-containing sulphite solution is treated with concentrated nitric acid and iodine is precipitated. Yield: 18.6 g of dry iodine (83% of theory).

Step 2

Manufacture of perfluoroalkylethylarcylic ester from step 1: 10 g of 5% oleum, 13.8 g of acrylic acid and 0.2 g of hydroquinone-monomethyl ether are added to the reaction mixture of step 1 and the whole mixture is kept for 2 hours at 85° C and then cooled. The benzene phase is diluted with 200 ml of ether and poured on a solution of 3 g of sodium sulphite and 100 g of ice. The organic phase is washed neutral and distilled to leave as residue 74.0 g of ester (81.78% of theory). The crude product is distilled in a high vacuum and yields 64.2 g of ester (71% of theory); boiling point 80°–150° C/0.03 Torr.

| Analysis: | |
|---|---|
| Calculated for | $C_8F_{17}CH_2CH_2OOCCH=CH_2$: |
| | C,30.2%  H,1.36%; O,6.18%; F,62.4%. |
| found : | C,28.7%; H,1.4%. |

EXAMPLE 2

The following batch is reacted in accordance with the particulars given in Example 1:
step 1
 100 ml of 25% oleum
 100 g of perfluoralkylethyl iodide*)

*)
Composition of the perfluoroalkylethyl iodide mixture:
23,75%   $C_6F_{13}CH_2CH_2I$      The ultimate analyses
46,61%   $C_8F_{17}CH_2CH_2I$      were always calculated on
24,68%   $C_{10}F_{21}CH_2CH_2I$   $R_f = C_8F_{17}$
Also $C_{12}F_{25}CH_2CH_2I$ and impurities step 2
 22.2 g of $H_2SO_4$(10%)
 13.8 g of acrylic acid dissolved in
 500 ml of benzene
 0.5 g of hydroquinone-momomethyl ether (as inhibitor).
Crude yield: 75.4 g of ester (83% of theory).

After distillation in a high vacuum: 65.2 g of ester (72.0% of theory).

Analysis calculated for $C_8F_{17}CH_2CH_2OOCCH=CH_2$:
C,30.2%; H,1.36%.
found: C,27.9%; H, 1.25%.

Yield of iodine: 17 g (77% of theory).

EXAMPLE 3

Perfluoroalkylisopropylacrylic ester is manufactured analogous to the process described in Examples 1 and 2.

Batch step 1:
 100 ml of 25% oleum
 100 g of perfluoroalkylisopropyl iodide**)
step 2:
 22.2 g of $H_2SO_4$ (10%)
 13.5 g of acrylic acid
 500 ml of benzene
 0.5 g of hydroquinone-monomethyl ether.
 Reaction: 16 hours at 80° to 85° C.
 Yield of iodine: 18.5 g (85.65% of theory)
 Yield of ester: 65.0 g (71.65% of theory).

Analysis calculated for $C_8F_{17}CH_2$—
CH($CH_3$)—OOC—CH=$CH_2$:
C,31.60%; H,1.70%; O,6.00 F,60.80%.
found: C,31.8 %;H,1.3 %; F,58.9%.

EXAMPLE 4

Manufacture of perfluoroalkylethylfumaric acid diseter. The process as described in Examples 1 to 3 is carried out.

Batch step 1:
 100 g of 25% oleum
 100 g of perfluoroalkylethyl iodide*)
 22.2 g of $H_2SO_4$ (10%)

*)
Composition of the perfluoroalkylethyl iodide mixture:
23,75%  $C_6F_{13}CH_2CH_2I$  The ultimate analyses
46,61%  $C_8F_{17}CH_2CH_2I$  were always calculated on
24,68%  $C_{10}F_{21}CH_2CH_2I$  $R_f = C_8F_{17}$
Also $C_{12}F_{25}CH_2CH_2I$ and impurities step 2:
 11.1 of fumaric acid
 500 ml of toluene
 0.5 g of hydroquinone-monomethyl ether.
 Esterification: 16 hours at 110° C.
 Yield of iodine: 16.7 g (75.5% of theory).
 Crude yield of fumaric diester: 61.5 g (78.06% of theory); b.p. 69°–209° C/0.01 Torr.
 Microanalysis calculated for

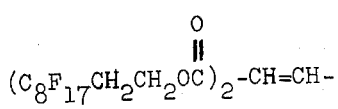

found: C,28.60%; H,1.0%; O 6.36%; F,64.20%.
C,28.4 %; H,1.3%; F,62.4 4%

Analogous reaction products with comparable properties are obtained by using maleic, methylenemalonic or itaconic acid instead of fumaric acid.

EXAMPLE 5

The following batch is reacted in accordance with Example 1:
step 1:
 100 ml of 25% oleum
 100 g of perfluoroalkylisopropyl iodide **)

**)
24,22%  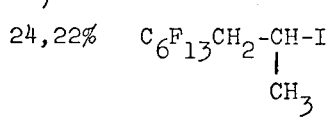

45,82%  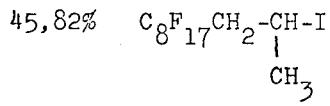

24,3 %  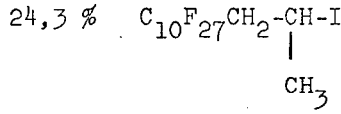

Also 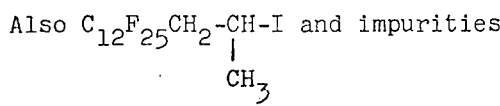 and impurities step 2:
 22.2 g of $H_2SO_4$ (10%)
 11.6 g of fumaric acid
 500 ml of toluene
 0.5 g of hydroquinone-monomethyl ether.
 Esterification: 12 hours at 110° C.
 Yield: 34 g (37.8% of theory) light brown ester
 Yield of iodine: 15.5 g (69.5% of theory).

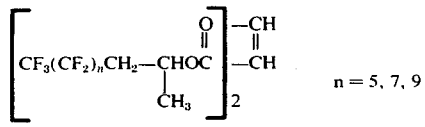 n = 5, 7, 9

Molecular weights:  n  5   7   9
                    M  822 922 1022
Mass spectrum       M−H = 821; 921; 1021

EXAMPLE 6

The following batch is reacted according to Example 1:
step 1:
 100 g of 25% oleum
 100 g of perfluoroalkylisopropyl iodide **)

**)

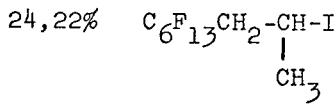
24,22%   $C_6F_{13}CH_2-CH(CH_3)-I$

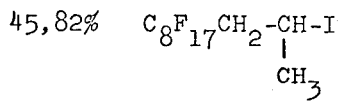
45,82%   $C_8F_{17}CH_2-CH(CH_3)-I$

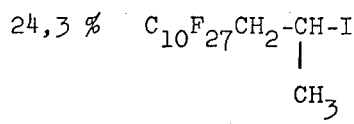
24,3 %   $C_{10}F_{27}CH_2-CH(CH_3)-I$

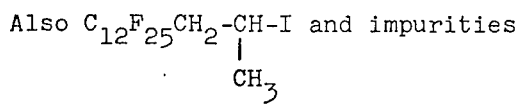
Also $C_{12}F_{25}CH_2-CH(CH_3)-I$ and impurities step 2:
16 g of methalcrylic acid
500 ml of benzene
0.5 g of hydroquinone-monomethyl ether
Reaction: 16 hours at 80° C
Crude yield of ester: 58 g = 62% of theory
After distillation in a high vacuum (98°–110° C/0.5 Torr)
41 g (43.8% of theory)
Yield of iodine: 13.5 g (62.2% of theory)

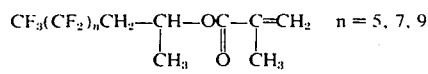
$CF_3(CF_2)_nCH_2-CH(CH_3)-OC(O)-C(CH_3)=CH_2$   n = 5, 7, 9

| Molecular weights: | n | 5 | 7 | 9 |
|---|---|---|---|---|
|  | M | 646 | 546 | 446 |
| Mass spectrum: | M-H = | 645, | 545, | 445 |

EXAMPLE 7

The following batch is reacted in accordance with Example 1:
step 1:
150 ml of oleum
100 g of perfluoroalkylethyl iodide*)

*)
Composition of the perfluoroalkylethyl iodide mixture:
23,75%   $C_6F_{13}CH_2CH_2I$    The ultimate analyses
46,61%   $C_8F_{17}CH_2CH_2I$    were always calculated on
24,68%   $C_{10}F_{21}CH_2CH_2I$   $R_f = C_8F_{17}$
Also $C_{12}F_{25}CH_2CH_2I$ and impurities step 2:
500 ml of toluene
12 g of methacrylic acid
0.5 g of hydroquinone-monomethyl ether
Esterification: 14 hours at 110° C
Yield after distillation in a high vacuum (100°–160° C/0.5 Torr) 24.0 g (25.9% of theory).

Analysis calculated for $C_8F_{17}CH_2CH_2$—OOC—$C(CH_3)=CH_2$:
C,25.9 %; H,1.08%; O,3.45%; F,69.7%.
found       C,25.75%, H,1.05%,        F,67.4%.

EXAMPLE 8

The process is carried out as in Example 1, but the resulting iodine is extracted with 2000 ml of toluene and distilled off after completion of step 2, and not after completion of step 1.
step 1:
100 ml of 25% oleum
100 g of perfluoroalkylethyl iodide*)

*)
Composition of the perfluoroalkylethyl iodide mixture:
23,75%   $C_6F_{13}CH_2CH_2I$    The ultimate analyses
46,61%   $C_8F_{17}CH_2CH_2I$    were always calculated on
24,68%   $C_{10}F_{21}CH_2CH_2I$   $R_f = C_8F_{17}$
Also $C_{12}F_{25}CH_2CH_2I$ and impurities step 2:
22.2 g of $H_2SO_4$ (10%)
11.4 g of itaconic acid
500 ml of toluene
Reaction conditions: 16 hours at 110° C.
Toluene and itaconic acid are distilled off to dryness. The residue is taken up in diethyl ether, the solution is washed with $Na_2SO_3$ solution, dried and concentrated, to give a light yellow, wax-like compound of the formula

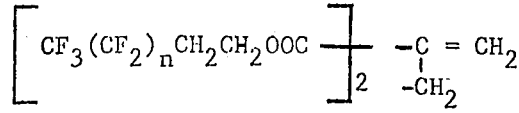
$$\left[CF_3(CF_2)_nCH_2CH_2OOC-\right]_2 -C(-CH_2)=CH_2$$

Boiling point range: 56° to 100° C/0.02 Torr.
The ester decomposes on distillation in a high vacuum. Mass spectrum:

| | | M (theoretical value): | |
|---|---|---|---|
| n = 5 : 5 M | 822 | | 822 |
| n = 5 : 7 M | 922 | | 922 |
| n = 7 : 7 M | 1022 | | 1022 |
| n = 7 : 9 M | 1122 | | 1122 |
| n = 9 : 9 M | 1222 | | 1222 |
| M – F = | 822 – 19 = 803 | | |
| | 922 – 19 = 903 | | |
| | 1022 – 19 = 1003 | | |
| | 1122 – 19 = 1103 | | |
| | 1222 – 19 = 1203 | | |

Yield: 80,0 g (89,6% of theory)

EXAMPLE 9

The following components are reacted according to the process described in Example 8:
step 1:
100 ml of 25% oleum
100 g of iodide of the formula

$CF_3(CF_2)_n(CH_2CF_2)_oCH_2CH_2I$***)

***)
16,70%   $C_6F_{13}CH_2CF_2CH_2CH_2I$
30,95%   $C_8F_{17}CH_2CF_2CH_2CH_2I$
4,84%    $C_{10}F_{21}CH_2CF_2CH_2CH_2I$
18,80%   $C_6F_{13}(CH_2CF_2)_2CH_2CH_2I$
9,46%    $C_8F_{17}(CH_2CF_2)_2CH_2CH_2I$

-Continued 2,60%   $C_{10}F_{21}(CH_2CF_2)_2CH_2CH_2I$
5,6%    $C_{6-10}(CH_2CF_2)_3CH_2CH_2I$
Remainder on 100% impurities.

step 2:
22.2 g of $H_2SO_4$ (10%)
12.35 g of acrylic acid
500 ml of benzene
0.5 ml of hydroquinone-monomethyl ether
Reaction conditions: 16 hours at 80° to 85° C
Yield of iodine: 14.5 g (73.2% of theory)
Yield of ester: 53.5 g (58.9% of theory)
A light yellow compound of the formula $$CF_3(CF_2)_n(CH_2CF_2)_oCH_2CH_2OOCCH=CH$$

is obtained.
Boiling point range: 95° to 140° C/0.03 Torr.

Mass spectrum:
n = 5 M = 482 M–HF = 462      M (theoretical value): 482
n = 7 M = 582 M–HF = 562                              582
n = 9 M = 682 M–HF = 662                              682

In addition, it is possible to identify as by-products in the mass spectrum esters of the formula $$CF_3(CF_2)_n(CH_2CF_2)_2CH_2CH_2OOCCH=CH_2.$$

n = 5 M = 546 M–HF = 526      M (theoretical value): 546
n = 7 M = 646 M–HF = 626                              646
n = 9 M = 746 M–HF = 726                              746

Reaction products with comparable properties are obtained by reaction with methacrylic acid, vinylacetic acid, crotonic acid, methylenemalonic acid, itaconic acid, maleic acid, fumaric acid.

EXAMPLE 10

The following components are reacted in accordance with the process described in Example 8:
step 1:
180 ml of 25% oleum
180 g of iodide of the formula****)

$$CF_3(CF_2)_nCH_2CHFCH_2Ch_2I$$

****)
23,1%   $C_6F_{13}CH_2CHFCH_2CH_2I$
46,0%   $C_8F_{17}CH_2CHFCH_2CH_2I$
21,3%   $C_{10}F_{21}CH_2CHFCH_2CH_2I$
3,5%    $C_6F_{13}(CH_2CHF)_2CH_2CH_2I$
Remainder on 100% impurities step 2:
45 g of $H_2SO_4$ (10%)
23 g of acrylic acid
500 ml of benzene
0.5 g of hydroquinone-monomethyl ether
Reaction conditions: 20 hours stirring at 82° C
Yield of iodine: 31.36 g (85% of theory)
Yield of ester: 55.3 g (33.71% of theory) (partial decomposition in distillation)
An ivory coloured wax of the formula $$CF_3(CF_2)_nCH_2CHFCH_2CH_2OOCCH=CH_2$$

is obtained.
Boiling range: 65°–140° C at o.03 Torr.

Mass spectrum:
n = 5 M = 464, M − HF = 444, M − OOCCH=CH$_2$ = 393
n = 7 M = 564, M − HF = 544, M − OOCCH=CH$_2$ = 493
n = 9 M = 664, M − HF = 644, M − OOCCH=CH$_2$ = 593

What is claimed is:
1. A process for the manufacture of perfluoroalkylalkyl esters of the formula

$$\left[ R_f(CH_2-\overset{R}{\underset{|}{CF}})_p C_nH_{2n}-O-\overset{O}{\underset{\|}{C}} \right]_s R_1$$

wherein:
$R_f$ represents an unbranched or branched perfluoroalkyl radical with 4 to 14 carbon atoms,
R represents hydrogen or fluorine,
$R_1$ represents an ethylenically unsaturated hydrocarbon radical of organic mono-, di- or tribasic carboxylic acids with 3 to 6 carbon atoms,
n is a whole number from 1 to 12,
p is 0 or a whole number from 1 to 3, and
s is a whole number from 1 to 3, which process comprises reacting a perfluoroalkylalkyl iodide of the formula $$R_f-(CH_2-\overset{R}{\underset{|}{CF}})_p - C_nH_{2n} - I$$

with oleum at a temperature range of 30° to 130°C adding to the resulting reaction mixture water in an amount sufficient to convert excess sulfur trioxide present in said oleum to sulfuric acid, while maintaining said temperature range and subsequently reacting the reaction mixture, without isolation of the fluorine-containing reaction product, with an organic carboxylic acid of the formula $$R_1-(COOH)_s$$

in an aromatic organic solvent at temperatures of 80° to 150°C, the iodine formed is separated before or after the reaction with the organic carboxylic acid.

2. A process according to claim 1 for the manufacture of perfluoroalkylalkyl esters of the formula $$\left[ R_f-C_nH_{2n}-O-\overset{O}{\underset{\|}{C}}- \right]_s R_1 \quad ,$$

wherein $R_f$ represents an unbranched or branched perfluoroalkyl radical with 4 to 14 carbon atoms, $R_1$ represents an ethylenically unsaturated hydrocarbon radical of organic mono-, di- or tribasic carboxylic acids with 3 to 6 carbon atoms, $n$ is a whole number from 1 to 12, and $s$ is a whole number from 1 to 3, which process comprises reacting a perfluoroalkylalkyl iodide of the formula $$R_f-C_nH_{2n}-I$$

with oleum at 30° to 130°C and subsequently reacting the reaction mixture, without isolation of the fluorine-containing reaction product, with an organic carboxylic acid of the formula $$R_1-(COOH)_s$$

in an aromatic organic solvent at temperatures of 80° to 150°C, the iodine formed is separated before or after the reaction with the organic carboxylic acid.

3. A process according to claim 1, wherein a perfluoroalkylalkyl iodide of the formula $$C_mF_{2m+1}-(CH_2-\overset{R}{\underset{|}{CF}})_p-C_nH_{2n}-I$$

is used, in which $m$ is a whole number from 4 to 12, $n$ is a whole number from 1 to 12, and $p$ is 0 or a whole number from 1 to 3.

4. A process according to claim 3 wherein $n$ is a whole number from 2 to 6.

5. A process according to claim 3, wherein a perfluoroalkylalkyl iodide of the formula $$C_mF_{2m+1}-C_nH_{2n}-I$$

is used, in which $m$ is a whole number from 4 to 12 and $n$ is a whole number from 1 to 12.

6. A process according to claim 5 wherein $n$ is a whole number from 2 to 6.

7. A process according to claim 3, wherein a perfluoroalkylalkyl iodide of the formula $$F-(CF_2)_m-(CH_2CF_2)_{p'}-CH_2-CH_2-I,$$

$$F-(CF_2)_m-(CH_2CF_2)_{p'}-CH_2-\underset{\underset{CH_3}{|}}{CH}-I$$

$$F(CF_2)_m-(CH_2CHF)_{p'}-CH_2CH_2-I$$

and $$F(CF_2)_m(CH_2CHF)_{p'}-CH_2-\underset{\underset{CH_3}{|}}{CH}-I$$

is used, in which $m$ is a whole number from 4 to 12 and $p'$ is a whole number from 1 to 3.

8. A process according to claim 3, wherein a perfluoroalkylalkyl iodide of the formula $$F(CF_2)_mCH_2CH_2I \quad \text{and} \quad F(CF_2)_mCH_2\underset{\underset{CH_3}{|}}{CH}-I$$

is used, in which $m$ is a whole number from 4 to 12.

9. A process according to claim 7, wherein a perfluoroalkyl iodide of the formula $$F(CF_2)_m-CH_2-CHF-CH_2-CH_2-I$$

and $$F(CF_2)_m-CH_2-CHF-CH_2-\underset{\underset{CH_3}{|}}{CH}-I$$

is used, in which $m$ is a whole number from 4 to 12.

10. A process according to claim 7, wherein a perfluoroalkyl iodide of the formula $$F-(CF_2)_m-CH_2-CF_2-CH_2-CH_2-I$$

and $$F-(CF_2)_m-CH_2-CF_2-CH_2-CH_2-I$$

is used, in which $m$ is a whole number from 4 to 12.

11. A process according to claim 1 wherein acrylic acid, methacrylic acid, crotonic acid, vinylacetic acid, fumaric acid, maleic acid, methylenemalonic acid, citraconic acid, mesaconic acid, itaconic acid, or aconitic acid is used as organic carboxylic acids.

12. A process according to claim 1 wherein the reaction with oleum is carried out at temperatures of 90° to 120°C.

13. A process according to claim 1, wherein the reaction with the organic carboxylic acid is carried out in benzene, toluene, or xylene.

* * * * *